United States Patent

[11] 3,551,697

[72] Inventor James C. Candy
Convent Station, N.J.
[21] Appl. No. 712,675
[22] Filed Mar. 13, 1968
[45] Patented Dec. 29, 1970
[73] Assignee Bell Telephone Laboratories Incorporated
Murray Hill, Berkeley Heights, N.J.
a corporation of New York

[54] TRIGGER CIRCUIT EMPLOYING CONSTANT CURRENT SOURCES

11 Claims, 8 Drawing Figs.

[52] U.S. Cl. .......... 307/235, 307/264, 307/289, 307/290, 328/150, 328/203
[51] Int. Cl. .......... H03k 5/20
[50] Field of Search .......... 307/235, 264, 289, 290; 328/150, 146, 147, 191, 203

[56] References Cited
UNITED STATES PATENTS

| | | | |
|---|---|---|---|
| 3,178,585 | 4/1965 | Kerenyi .......... | 307/235 |
| 3,239,694 | 3/1966 | Rovell .......... | 307/235 |
| 3,267,296 | 8/1966 | Fuss .......... | 307/233 |
| 3,348,068 | 10/1967 | Miller .......... | 307/235 |
| 3,412,264 | 11/1968 | Preston .......... | 307/235 |

*Primary Examiner*—Stanley D. Miller, Jr.
*Attorneys*—R. J. Guenther and William L. Keefauver

ABSTRACT: Signals which differ from a reference voltage by as little as $10^{-3}$ volts are detected in approximately 3 nanoseconds by an extremely stable and precise trigger circuit. As this circuit has a high input impedance, it neither unduly loads the signal source nor feeds significant transients back to its own input when it triggers. In addition, once triggered its output is insensitive to changes in input signal level.

INVENTOR
J. C. CANDY
BY A.H. MacPherson
ATTORNEY

TRIGGER CIRCUIT EMPLOYING CONSTANT CURRENT SOURCES

BACKGROUND OF THE INVENTION

This invention relates to trigger circuits, and, in particular, to circuits which respond in some way to input signals which exceed given threshold values.

Circuits which produce output signals in response to input signals above selected amplitudes are frequently used in pulse code modulators. Typically, a number of such "trigger" or "threshold" circuits, each with a different response threshold, are connected to a signal source. Code values are assigned to samples of an input signal according to which trigger circuits produce output signals.

For such a pulse code modulation technique to be successful, particularly at frequencies in the 10 to 20 MHZ and above region, the threshold or trigger circuit must have certain properties not commonly found in conventional trigger circuits.

Thus, the trigger threshold must be extremely stable and precise so that the circuit responds accurately to the unamplified input signal.

The response of the circuit, once triggered, must be extremely rapid.

The input impedance of the circuit must be large so that many trigger circuits can be connected to a single source without either undue loading of the source or noticeable interaction between trigger circuits.

The circuit must not feed significant transients back to its own input when it triggers, as such transients would trigger adjacent circuits erroneously.

Finally, once the circuit triggers, its output signal must be insensitive to subsequent changes in input signal level.

SUMMARY OF THE INVENTION

This invention provides just such a triggering circuit. The circuit of this invention can detect signals which differ from a reference threshold by as little as $10^{-3}$ volts in as little as 10 nanoseconds. Because the level detecting and triggering elements of the circuit are maintained at essentially the same temperature the circuit is essentially temperature stabilized. Once triggered, drastic changes in input signal level have no effect on the circuit's output voltage. And finally, a high input impedance prevents both undue loading of the source by the circuit and the feeding of transients through the circuit back to the source.

In accordance with this invention, a reference current of a selected amplitude is made to flow normally through a balance device, typically a transistor. An input element, connected to one terminal of the balance device, produces an output signal only when an input signal exceeds a precisely defined threshold value. Because the input element is carefully selected to be matched in characteristics with the balance device, the output currents from the two devices are equal immediately after the input element becomes active. This equality of currents is sensed by a balance detector, typically a constant current source, and is reflected as a voltage rise on one element of a trigger device. This voltage rise activates the trigger device which, in turn, shuts off the input element and the balance device. The currents and voltages associated with the input element, the balance device, and the trigger device are such that the trigger device continues to conduct regardless of variations in the input signal within expected limits. A reset pulse restores the circuit to its initial condition in preparation for another input signal.

The above-described triggering action takes place very rapidly—usually between 3 to 10 nanoseconds—and because of the matched characteristics of the input element a nd the balance device, at a highly repeatable voltage threshold. Yet the circuit is quite simple, containing in one embodiment only three transistors plus associated voltage sources, resistors, and diodes.

This invention will be more fully understood from the following detailed description of embodiments thereof taken together with the drawings. BRIEF DESCRIPTION OF THE DRAWINGS

DETAILED DESCRIPTION

Figure 1:
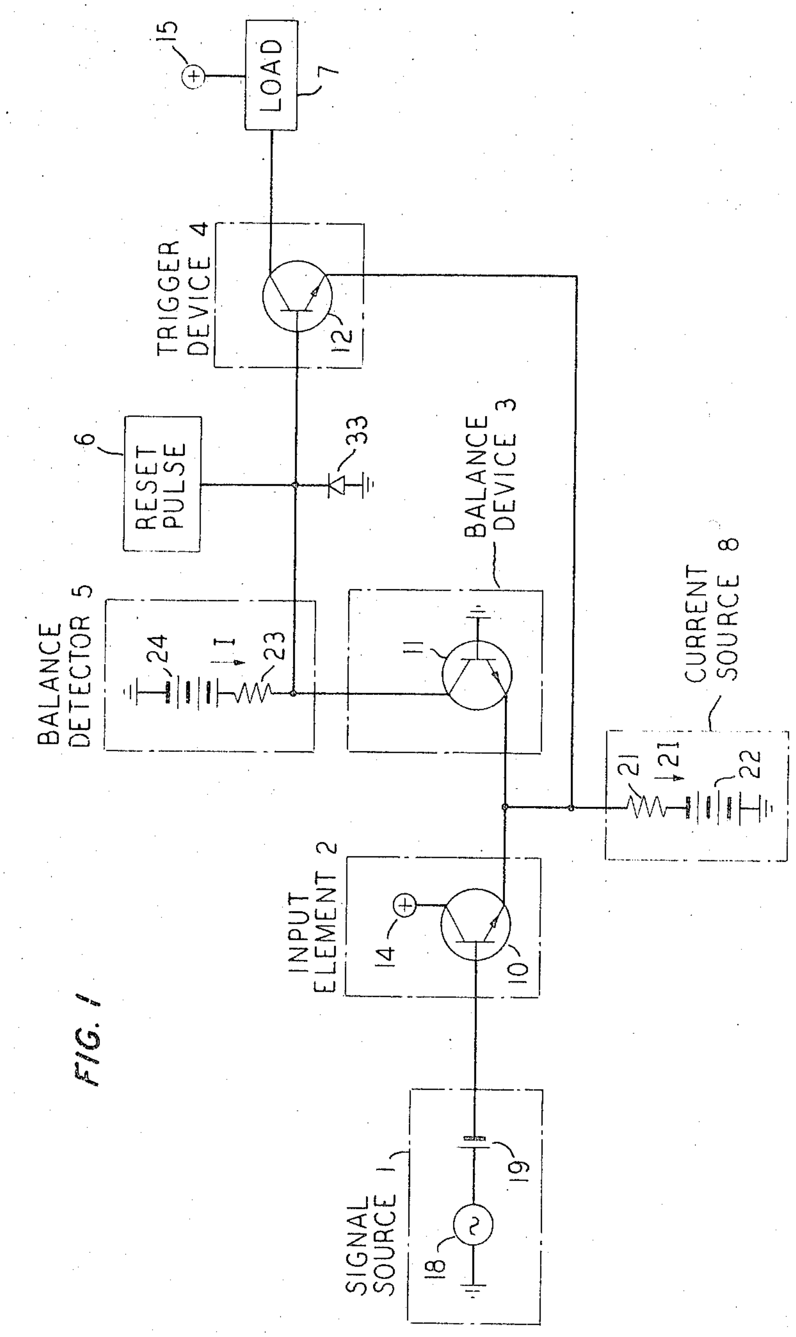
FIG. 1 is a schematic block diagram of this invention.

FIG. 1 shows schematically this invention. The elements shown in FIG. 1 will be described first as they are initially, before triggering occurs. Then the transient behavior of these elements in response to an input signal of sufficient amplitude to trigger the circuit will be described. And finally, the second stable condition assumed by this circuit after triggering will be described.

Initially, input element 2, consisting of transistor 10 and positive voltage source 14, is cut off by the negative voltage from source 19 applied to the base of transistor 10. Trigger device 4, consisting of transistor 12, likewise initially conducts no current. Current source 8, consisting of resistor 21 and voltage source 22, on the other hand, draws the current 21 through balance device 3 consisting of transistor 11. I amps of this current are supplied to source 8 by detector 5, consisting of resistor 23 and voltage source 24, through the collector and emitter of transistor 11. The other I amps of current required by source 8 are drawn through diode 33 and likewise pass through the collector and emitter of transistor 11. Alternatively, diode 33 can be removed and then the current I formerly passed through this diode is drawn through the base and emitter of transistor 11. If diode 33 is omitted, transistor 11 saturates because the current 21 conducted by its emitter exceeds the current I available at its collector. The voltage difference between its emitter and collector is then small, that is, less than 100 millivolts.

If diode 33 is included, transister 11 does not saturate but the voltage difference between its emitter and collector is still small; that is, between between 10 and 100 millivolts. Because the emitter of transister 11 is sufficiently negative with respect to ground to make the emitter conduct, that is about one-half volt, the collector is also slightly negative with respect to ground; that is, the collector is a little less than one-half volt beneath ground. This negative collector voltage makes diode 33 conduct. Because the collector of transistor 11 is connected directly to the base of transistor 12, while the emitters of transistors 11 and 12 are also connected directly together, the base-to-emitter voltage of transistor 12 is likewise only a few millivolts. As a result, transistor 12 is initially cut off.

Transistor 10 remains cut off until a signal from source 18 exceeds in amplitude the threshold voltage of source 19. As the voltage on the base of transistor 10 approaches ground in response to a signal from source 18, transistor 10 begins to conduct slightly when the base voltage exceeds the emitter voltage. Transistor 10 is identical in characteristics to transistor 11. Thus, when the voltage on the base of transistor 10 equals ground, the emitter currents of transistor 10 and 11 are each equal to I. At this moment, diode 33 no longer is required to pass the current I. As a result, diode 33 becomes reverse biased, the collector voltage of transistor 11 rises, and the voltage on the base of transistor 12 rises rapidly from slightly below ground potential to a positive value. This rise in voltage turns on transistor 12. The current that flows into the emitter of transistor 12 further reduces the current flowing in transistor 11 so that the collector voltage of transistor 11 and the base voltage of transistor 12 rise rapidly. Because the base-to-emitter voltage drop of conducting transistor 12 is small, about half a volt, the emitter voltages of all three transistors follow the base voltage of transistor 12 as it rises to a relatively large positive value, about 5 volts. The circuit reaches a new quiescent state where transistors 10 and 11 are both cut off because their bases are near ground potential and their emitters are positive. The current I from current source 5 flows partly into the base of transistor 12 but mostly into the reset pulse source 6. The current 2I drawn by current source 8 flows through transistor 12 coming mostly through the collector of this transistor via load 7, from bias source 15. The other part of the current 2I flows through the base from current source 5.

Transistor 12 continues to conduct until a reset pulse from source 6 drives the base of transistor 12 a selected amount beneath ground potential, thereby cutting off transistor 12 and turning on transistor 11. Because the reset pulse is supplied from an external source, the circuit remains triggered for as long as desired.

To prevent transistor 10 from being turned on by a large amplitude signal from source 18 while transistor 12 is conducting, the emitter voltages of transistors 10 and 11 are driven to a value greater than the maximum expected voltage from source 18 minus the voltage of threshold source 19.

The triggering action of this circuit, represented by the turning on of transistor 12, occurs very rapidly, in about 3 nanoseconds. Because transistors 10 and 11 have identical characteristics, and because the current from detector 5 is one-half the current required by source 8, this circuit is extremely precise and can detect signals as small as 1 millivolt above threshold 19. Additionally, because both transistors 10 and 11 dissipate extremely small amounts of power, these transistors remain at approximately uniform temperature, thereby preventing power dissipation from changing the operating threshold of the circuit. For example, when transistor 11 conducts it is almost saturated so the power dissipated is very small. When this transistor is cut off, little or no current flows so the power dissipated approaches zero.

Advantageously, as transistor 10 conducts only briefly, the input impedance of this trigger circuit seen by source 18 remains high, independent of the state of the circuit. Thus the loading on source 18 is kept small. For the same reason, transients from the output of this circuit are not fed back through transistor 10 to activate other trigger circuits connected to source 18.

Figure 2:
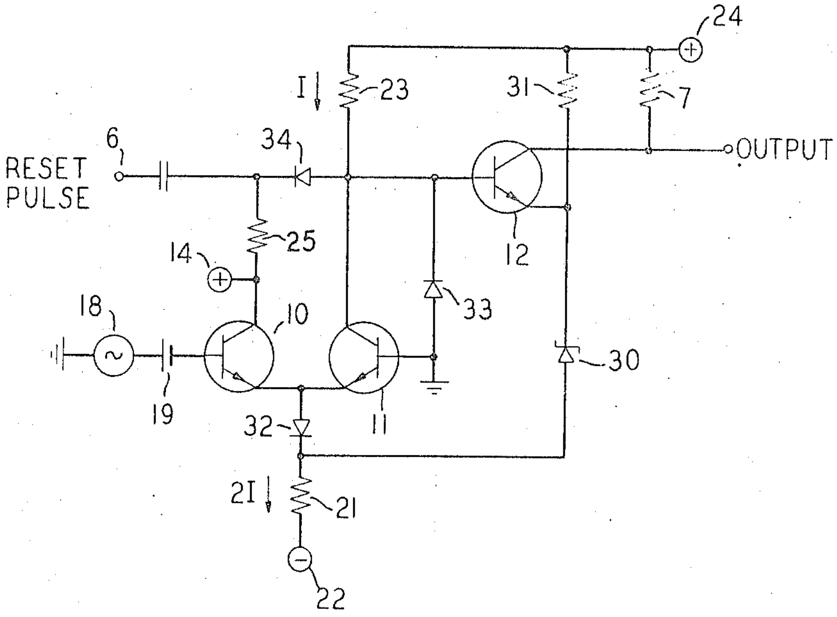
FIGS. 2 and 3 are circuit diagrams of two embodiments of this invention.

FIG. 2 illustrates one embodiment of this invention. The circuit shown in this figure contains, in addition to the elements described in FIG. 1, several diodes. The functions of these diodes will be described shortly.

Initially, transistor 11 is conducting the current 2I required by resistor 21 and source 22. Transistors 10 and 12 are cut off. One-half the current drawn through transistor 11 comes from voltage source 24 through resistor 23. The other half passes from ground through diode 33 and then via the collector and emitter of transistor 11 through diode 32 to resistor 21 and source 22. Transistors 10 and 12 are cut off.

As explained above, when the signal from source 18 exceeds the threshold voltage of source 19, driving the base of transistor 10 to ground, transistor 10 is turned on and, possessing the same characteristics as transistor 11, conducts the current I from source 14. Almost immediately, the current I passed through diode 33 stops, and diode 33 switches from its low impedance state to its high impedance state. As a result, the voltage on the base of transistor 12 rises, turning on this transistor and, by increasing the voltage on the emitters of transistors 10 and 11, shutting off these two transistors. Transistor 12 now must supply the current 2I required by resistor 21 and voltage source 22. Transistor 12 remains on until a reset pulse, of negative polarity from source 6, drives its base beneath ground a selected amount.

Diode 34 connects pulse source 6 to the base of transistor 12. This diode, which presents very small impedance to the reset pulse from source 6, likewise limits the positive voltage on the collector of transistor 11 to essentially the voltage of source 14. In addition, because resistor 25 connects diode 34 to source 14, diode 34 provides a low impedance through source 14 to ground. Thus, the current I from source 24 which passes through resistor 23 flows through resistor 25 and source 14 to ground. Because source 22 draws the current 2I through resistor 21, the collector current of transistor 12 becomes, in this arrangement, 2I.

Diode 32 protects the emitters of transistors 10 and 11 from large amplitude back voltages which might damage these transistors. Zener diode 30, biased by a small current through resistor 31, enhances the cutoff of transistor 12 and is needed because diode 32 makes the collector voltage of transistor 11 slightly higher initially than in the embodiment of FIG. 1. Thus the base voltage of transistor 12 might, in some cases, be enough above the emitter voltage of transistor 12 to make transistor 12 conduct. Therefore zener diode 30 raises the emitter voltage of transistor 12, thereby insuring that transistor 12 does not conduct until triggered.

Figure 3:
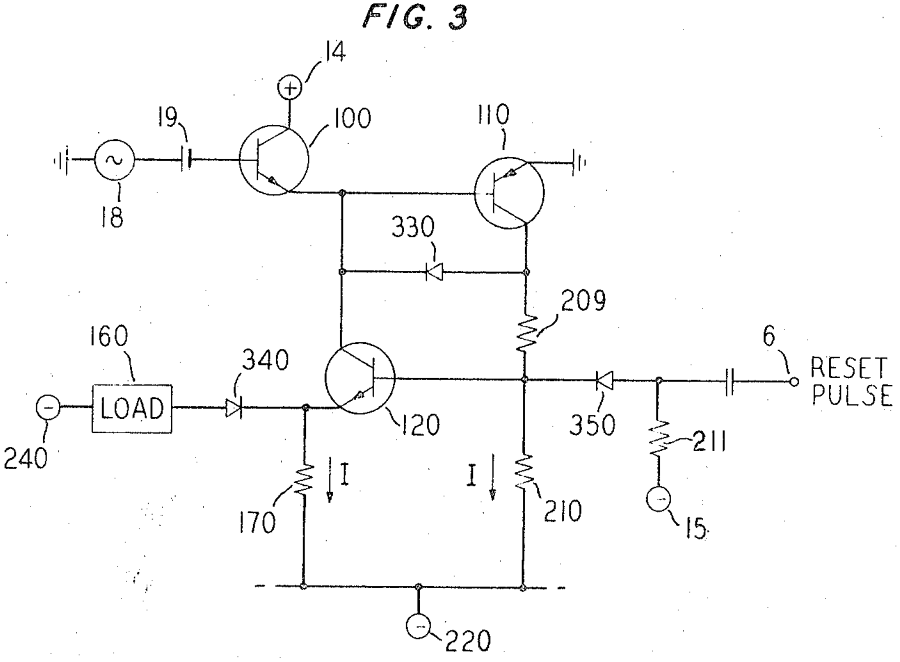
Figure 4A:
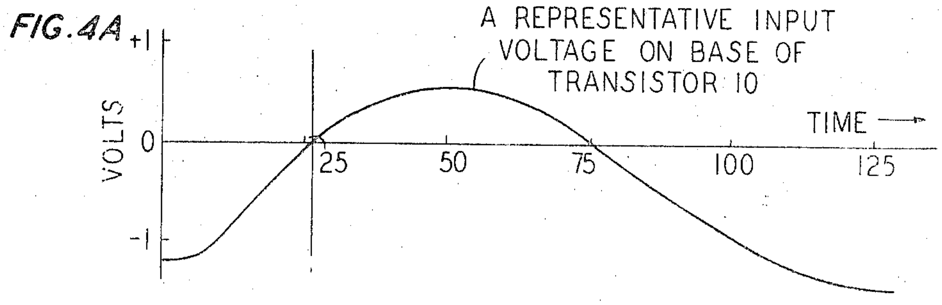
FIGS. 4A through 4E show selected waveforms use in understanding the operation of this invention.
Figure 4B:
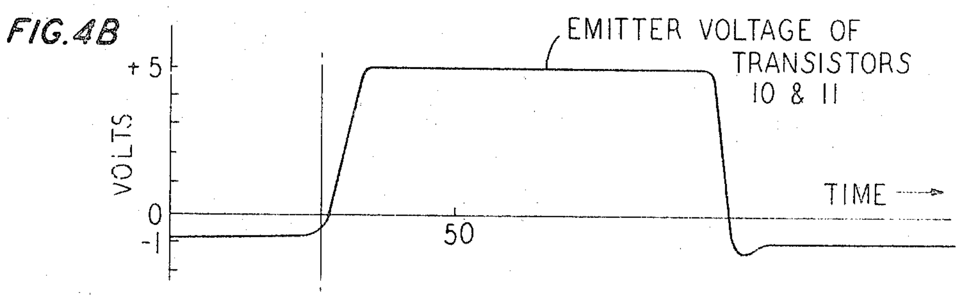
Figure 4C:
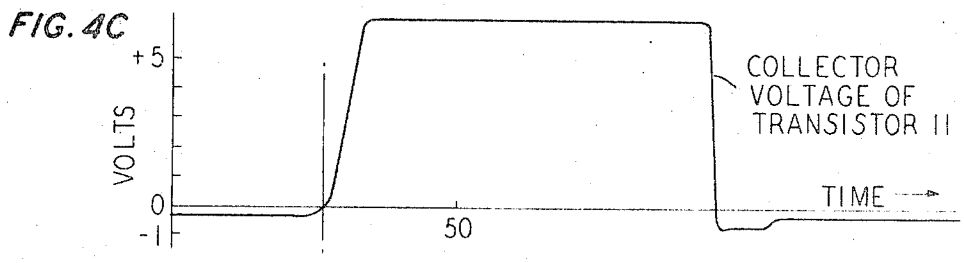
Figure 4D:
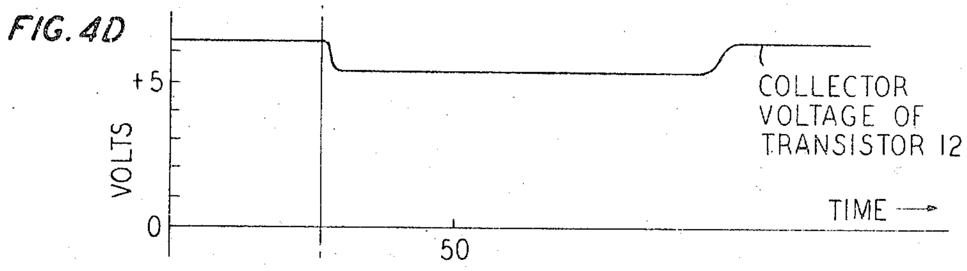
Figure 4E:
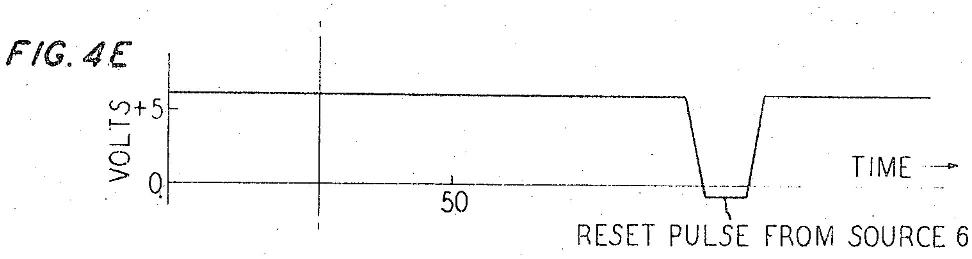

FIGS. 4A through 4E show representative waveforms generated at selected points in FIG. 2 plotted against time in nanoseconds. The input waveform applied to the to the base of transistor 10 is shown in FIG. 4A. FIG. 4B shows that as this input voltage reaches ground, the emitter voltage of transistors 10 and 11 rises very abruptly, cutting them both off. As a result, the collector voltage of transistor 11, shown in FIG. 4C, rises very sharply turning on transistor 12. Immediately the output voltage taken across resistor 7 drops from the voltage of source 24 to some other value, as shown in FIG. 4D. A reset pulse shown in FIG. 4E turns off transistor 12 and places the circuit in condition for a new input signal. FIG. 3 shows an embodiment of this circuit using both n-p-n and p-n-p transistors. Initially transistor 100 is cut off while transistors 110 and 120 conduct. Transistor 110, of the p-n-p type, is initially almost saturated. Its emitter draws the current 2I. Voltage source 220 draws the current I through resistor 170 and the current I through resistor 210. Thus, the current 2I in the emitter of transistor 110 is required to satisfy the current demanded by source 220 together with resistors 170 and 210.

Because transistor 110 is close to the saturation state, its collector voltage is only a few millivolts below its emitter voltage. Its base voltage is approximately one-half volt beneath ground. The base voltage of transistor 110 is the emitter vol tage of n-p-n transistor 100 and the collector voltage of n-p-n transistor 120. The current I through resistor 170 initially is the emitter current of n-p-n transistor 120. Resistors 209 and 210 are so selected to insure this by properly controlling the base voltage of transistor 120. Diodes 340 and 350 are initially in their high impedance state, while diode 330 is in its low impedance state, conducting slightly less, by the base current of transistor 120, than the emitter current of this transistor.

When an input voltage from source 18 drives the base of transistor 100 positive relative to its emitter, transistor 100 conducts. Because the operating characteristics of the n-p-n transistor 100 are the matched complement of the operating characteristics of p-n-p transistor 110, the emitter of transistor 100 draws a current equal to the current drawn by the emitter of transistor 110. Immediately the emitter current drawn by p-n-p transistor 110 drops from 2I to I. As a result, diode 330 switches to its high impedance state and the collector voltage of transistor 110 immediately drops from approximately ground (a few millivolts beneath the emitter voltage of transistor 110) to some negative value. The voltage at the base of transistor 120 immediately drops below the cutoff voltage, thereby turning off transistor 120. The collector voltage of transistor 120, formerly at approximately ground, now rises cutting off both transistor 100 and transistor 110. Immediately diodes 34 and 350 switch from their high impedance to their low impedance states and each diode passes the current I to a corresponding one of resistors 170 and 210. The output voltage across load 160 connected between diode 340 and voltage source 240 immediately drops, reflecting the change in impedance of diode 340. A positive reset pulse from source 6 turns on transistors 120 and 110 again and places the circuit back in its initial state.

The embodiment of this invention shown in FIG. 2 has been built and operated successfully. In this embodiment transistors 10, 11 and 12 are type 2N709; diode 30 is a 2-volt zener diode type 449A; diodes 32, 33 and 34 are type e HP2303; resistors 21, 23, 25 and 7 are 2.2K, 3.9K, 70 and 3.9K ohms, respectively; and resistor 31 is 30K ohms. Sources 22 and 24 are −20 and +20 volts, respectively. These values are meant to be illustrative only and in no way limit the scope of the claims.

It is to be understood that various changes or modifications may be made by workers skilled in the art without departing from the spirit and scope of the invention. Furthermore, while embodiments illustrative of the principles of this invention have been described, this invention is not limited to these embodiments. Other embodiments incorporating the principles of this invention will be obvious to those skilled in the transistor circuit arts in light of this disclosure.

I claim:

1. A trigger circuit comprising:

first and second transistors of matching characteristics, the base of said first transistor comprising the input to said circuit, the collector of said first transistor being connected to a first bias source and the emitter of said first transistor being connected to the base of said second transistor, the emitter of said second transistor being connected to ground, and said first and second transistors being of opposite type;

a third transistor of the same type as said first transistor, the collector of said third transistor being connected to the emitter of said first transistor and through a first diode to the collector of said second transistor, the emitter of said third transistor, comprising the output lead of said circuit, being connected to a first current source, the base of said third transistor being connected to a second current source, through a first resistor to the collector of said second transistor, and through a second diode and a second resistor to a second bias source; and a reset pulse source connected through said second diode to said base of said third transistor.

2. Apparatus as in claim 1 in which said first and third transistors are type n-p-n, and said second transistor is type p-n-p.

3. A trigger circuit comprising:

a first transistor, the base of which is the input to said trigger circuit, the collector of which is connected to a first bias source and the emitter of which is connected through a first diode to a first current source drawing a first selected current;

a second transistor, the base of which is connected to ground, the collector of which is connected to a second current source producing a second selected current and through a second diode and a resistor to said first bias source, and the emitter of which is connected through said first diode to said first current source;

a third transistor, the base of which is connected to said second current source and through a third diode, to ground, the emitter of which is connected through a zener diode to said first current source, and the collector of which, the output of said trigger circuit, is connected through a load to a second bias source; and a reset pulse source coupled through said second diode to the base of said third transistor and the collector of said second transistor.

4. Apparatus as in claim 3 in which:

said first transistor, initially nonconducting, responds to an input voltage above a selected amplitude by conducting a current I from said first bias source to said first current source;

said first current source draws 2I amps current;

said second current source produces I amps current;

said third diode, initially in its low impedance state passing I amps current, responds to the change in state of said first transistor by changing from its low impedance to its high impedance state thereby passing essentially zero current;

said second transistor, initially possessing a collector voltage only a few millivolts above its emitter voltage thereby passing the 2I amps total current from said second current source and said third diode through said first diode to said first current source, responds to the change in state of said third diode in such a way that its collector voltage rises relative to its emitter voltage to a voltage compatible with the passage of I amps through this transistor; and said third transistor, initially in its nonconducting state, responds to the change in collector voltage of said second transistor by changing to its conducting state, thereby forcing said first and second transistors back to their nonconducting states, said third transistor now passing I amps from said second bias source through said load to said first current source and I amps from said second current source to said first current source.

5. A trigger circuit comprising:

a first transistor, initially cutoff, the base of which is the input to said trigger circuit, said first transistor changing from cutoff to conducting in response to an input signal which exceeds a selected threshold;

a first current source drawing the current 2I;

a second current source producing the current I;

a second transistor, matched in characteristics to said first transistor, which initially conducts the current 2I drawn by said first current source, the base of said second transistor being connected to ground, the emitter of said second transistor being connected to the emitter of said first transistor, and the collector of said second transistor being connected to said second current source, said second transistor changing from an initial state in which its collector voltage exceeds its emitter voltage by only a few millivolts to a second state in which its collector voltage equals the collector voltage of said first transistor; and a third transistor initially cut off, which in response to the change in collector voltage of said second transistor changes from cut off to conducting and, in turn, cuts off said first and second transistors while supplying the current 2I required by said first current source, the collector of said third transistor constituting the output of said trigger circuit.

6. Apparatus as in claim 5 including a reset pulse source connected to the base of said third transistor and the collector of said second transistor for providing a pulse to cut off said third transistor and to turn on said second transistor, and a diode connected between ground and the collector of said second transistor, which initially passes I amps of the 2I current drawn by said first current source, but which changes to its high impedance state in response to the change in state of said first transistor from cutoff to conducting.

7. In combination:

a current source drawing the current 2I;

first means, initially providing no current, for providing, in response to an input signal above a selected amplitude, I amps of the current 2I drawn by said current source;

second means, initially providing the current 2I drawn by said current source, for providing a current I to said current source in response to the current I provided by said first means; and third means, responsive to the change from 2I to I of the current provided by said second means, for producing an output signal and for providing the current 2I drawn by said current source to cut off concurrently said first and second means.

8. The combination of claim 7 including reset pulse means distinct from said input signal for resetting said first, second, and third means to their initial states.

9. A trigger circuit which comprises:

a first transistor, the base of which is the input terminal of said trigger circuit, the collector of which is connected to a first bias source, and the emitter of which is connected to a first current source;

a second transistor, the base of which is connected to a fixed potential, the emitter of which is connected to said first current source, and the collector of which is connected to a second current source; and a third transistor, the base of which is connected to said collector and said base of said second transistor, the emitter of which is connected to said first current source, and the collector of which comprises the output terminal of said trigger circuit.

10. The trigger circuit of claim 9 further comprising a reset pulse source connected to the base of said third transistor.

11. The trigger circuit of claim 10 wherein said first current source draws 2I amps current and said second current source produces I amps current.